US008717349B2

(12) United States Patent
Tsai et al.

(10) Patent No.: US 8,717,349 B2
(45) Date of Patent: May 6, 2014

(54) SOURCE DRIVER

(75) Inventors: Chien-Hung Tsai, Tainan (TW); Jia-Hui Wang, Tainan (TW); Chin-Tien Chang, Tainan County (TW); Ying-Lieh Chen, Tainan County (TW)

(73) Assignees: Himax Technologies Limited, Tainan (TW); NCKU Research & Development Foundation, Tainan (TW)

(*) Notice: Subject to any disclaimer, the term of this patent is extended or adjusted under 35 U.S.C. 154(b) by 899 days.

(21) Appl. No.: 12/549,636

(22) Filed: Aug. 28, 2009

(65) Prior Publication Data

US 2011/0050677 A1 Mar. 3, 2011

(51) Int. Cl.
*G06F 3/038* (2013.01)

(52) U.S. Cl.
USPC .......... 345/213

(58) Field of Classification Search
None
See application file for complete search history.

(56) References Cited

U.S. PATENT DOCUMENTS 7,808,468 B2* 10/2010 Son et al. .......... 345/98
2006/0250345 A1 11/2006 Shino et al.
2008/0278473 A1* 11/2008 An .......... 345/214
2009/0179890 A1* 7/2009 Nishimura et al. .......... 345/214
2010/0231577 A1* 9/2010 Kim et al. .......... 345/212

FOREIGN PATENT DOCUMENTS

TW 200516847 5/2005
TW 200521953 7/2005

OTHER PUBLICATIONS

"Office Action of Taiwan Counterpart Application", issued on Jun. 3, 2013, p. 1-p. 7, in which the listed references were cited.

* cited by examiner

*Primary Examiner* — Joseph Haley
*Assistant Examiner* — Emily Frank
(74) *Attorney, Agent, or Firm* — J.C. Patents

(57) ABSTRACT

A source driver adapted to drive a display panel is provided herein. The source driver includes a first output buffer, a detection module and a conversion module. The first output buffer enhances a first pixel signal and thereby outputs a first enhanced pixel signal. The detection module detects a rise time of the first enhanced pixel signal. The conversion module adjusts a driving capability of the first output buffer in response to the rise time for adjusting a slew rate of the first output buffer. Therefore, the first output buffer in the source driver can dynamically and automatically adjusts the slew rate of the first output buffer through a feedback mechanism composed of the detection module and the conversion module.

11 Claims, 4 Drawing Sheets

SOURCE DRIVER

BACKGROUND OF THE INVENTION

1. Field of Invention

The present invention relates to a source driver, and more particular, to a source driver that includes a feedback mechanism to adjust a slew rate of an output buffer included in the source driver.

2. Description of Related Art

In recent years, liquid crystal displays (LCDs) have become dominant in the market due to the advantages of low power consumption, zero radiation, and high space utilization. The source driver is an important component in the driving system of the display device, which is used for converting a digital video signal to a driving voltage and providing the driving voltage to a pixel electrode in association with a certain enabled scan line. The driving voltages provided to the pixel electrode are not as good as expected because of the panel loading effect and the process variation so that the source driver utilizes the output buffers to enhance the driving abilities of its driving channels.

Generally, an operational amplifier is utilized to implement the output buffer in the source driver. The operational amplifier has many specification parameters, such as a unity-gain frequency, phase margin, power consumption, common-mode rejection ratio, power-supply rejection ratio, input common mode range, slew rate, and noise. The slew rate refers to a change rate of an output voltage, which is generally defined as volt/second (or microsecond). It should be noted that, the slew rate may affect an image quality of the LCD directly. The higher the slew rate is, the shorter the time required for the source driver to provide correct analog signals to a display panel will be. On the contrary, the lower the slew rate is, the longer the time required for the source driver to provide correct analog signals to the display panel will be. As a result, the lower slew rate may lead to blurring or flickering of images.

Moreover, the display panels with the same size fabricated by different factories may have different loads. Under the same system specification, e.g. scanning frequency, resolution of the display panel, or size of the display panel, the output buffer with limited driving ability or unadjustable slew rate may conform to the display panels fabricated by a minority of factories, so the application scope of the output buffer is limited.

SUMMARY OF THE INVENTION

Accordingly, the present invention provides a source driver that detects a slew rate of a signal outputted from an output buffer to the display panel, and thereby adjusts a driving capability of the output buffer according to time information of the detected slew rate under a voltage difference. Therefore, the source driver can dynamically and automatically adjusts the slew rate of the signal outputted from the output buffer for driving the display panels with different loads.

A source driver is provided in the present invention. The source driver includes a first output buffer, a detection module and a conversion module. The first output buffer receives and enhances a first pixel signal for outputting a first enhanced pixel signal via an output terminal thereof. The detection module is coupled to the output terminal of the first output buffer. The detection module detects a rise time of the first enhanced pixel signal. The conversion module is coupled between the first output buffer and the detection module. The conversion module adjusts a driving capability of the first output buffer in response to the rise time so as to adjust the slew rate of the first output buffer.

In an embodiment of the foregoing source driver, the detection module includes a first comparator, a second comparator, and a time-to-digital converter. The first comparator compares a voltage of the first enhanced pixel signal with the first preset voltage, and thereby outputs a first indication signal. The second comparator compares the voltage of the first enhanced pixel signal with the second preset voltage, and thereby outputs a second indication signal. The time-to-digital converter generates a digital signal representing the rise time according to the first indication signal and the second indication signal.

In an embodiment of the foregoing source driver, the driving capability of the first output buffer is adjusted by adjusting a tail current of the first output buffer. The conversion module includes a first current mirror circuit. The first current mirror circuit generates a reference current according to the digital signal and generates the tail current by mirroring the reference current to the first output buffer.

In an embodiment of the foregoing source driver, the conversion module further includes a digital-to-analog converter. The digital-to-analog converter converts the digital signal representing the rise time into an analog input signal. The first current mirror circuit generates the reference current according to the analog input signal, and generates the tail current by mirroring the reference current to the first output buffer.

In an embodiment of the foregoing source driver, the source driver further includes a second output buffer and an output multiplexer. The second output buffer receives and enhances a second pixel signal for outputting a second enhanced pixel signal via an output terminal thereof. The output multiplexer is coupled between the display panel and the output terminals of the first output buffer and the second output buffer. The output multiplexer respectively transmits the first enhanced pixel signal and the second enhanced pixel signal to a first data line and a second data line of the display panel according to a switching signal.

The present invention provides the source driver that utilizes the detection module to obtain the rise time that the first enhanced pixel signal reaches the second preset voltage from the first preset voltage. The larger the rise time is, the larger the panel load may be. For adaptively driving the display panels with different loads, the conversion module adjusts the driving capability of the first output buffer in response to the rise time. The increases of the tail current assists in increasing a bias current flowing within the first output buffer so as to increase the driving capability of the output buffer and the slew rate of the signal outputted from the output buffer. Therefore, through the feedback mechanism composed of the detection module and the conversion module, the source driver can dynamically and automatically adjust the slew rate of the signal outputted from the output buffer for being adapted to drive the display panels with different loads.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
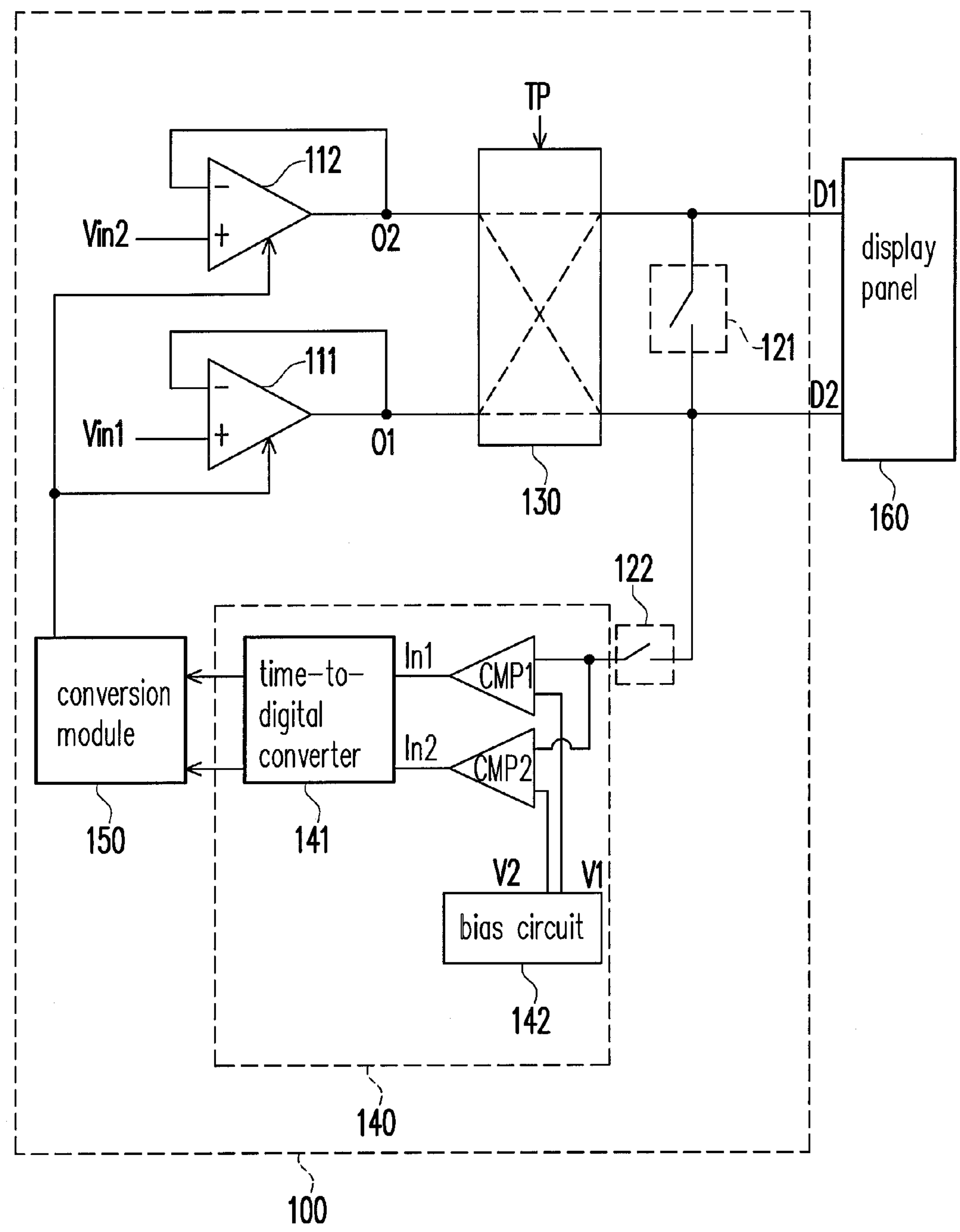
FIG. 1 is a diagram of a source driver according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a diagram of a source driver according to an embodiment of the present invention. Referring to FIG. 1, the source driver 100 is adapted to drive a display panel 160, such as a liquid crystal display (LCD) panel or a liquid crystal on silicon (LCOS) panel. The source driver 100 includes output buffers 111-112, switching unit 121-122, an output multiplexer 130, a detection module 140 and a conversion module 150. The output buffers 111-112, for example, are implemented by operational amplifiers. Each of the output buffers 111-112 is a unity-gain buffer in which an output terminal thereof coupled to an inverted terminal thereof. While the output buffer 111 receives a first pixel signal Vin1 via an input terminal thereof (i.e. a non-inverted terminal), in order to avoid signal attenuation, the output buffer 111 enhances the first pixel signal Vin1 and thereby outputs a first enhanced pixel signal via the output terminal O1 to the display panel 160. Similarly, while the output buffer 112 receives a second pixel signal Vin2 via an input terminal thereof (i.e. a non-inverted terminal), the output buffer 112 enhances the first pixel signal Vin2 and thereby outputs a second enhanced pixel signal via the output terminal O2 to the display panel 160.

As known, polarity inversion is usually performed on pixels of the display panel. It is assumed that the first pixel signal Vin1 and the second pixel signal Vin2 have different polarities, e.g. positive polarity and negative polarity. In order to reduce power consumption, the source driver 100 utilizes the output buffers 111-112 responsible for enhancing the first pixel signal Vin1 the second pixel signal Vin2 with different polarities, respectively. The output multiplexer 130 is coupled between the output terminals O1-O2 of the output buffers 111-112 and the display panel 160. When a switching signal TP is asserted to activate the output multiplexer 130, the output multiplexer 130 respectively transmits the first enhanced pixel signal from the output buffer 111 and the second enhanced pixel signal from the output buffer 112 to a data line D1 and a data line D2 of the display panel 160 or to the data line D2 and the data line D1 of the display panel 160 for performing polarity inversion.

The switching unit 121 is coupled between the output terminals O1 and O2 of the output buffer 111 and 113. After a scan signal associated with a scan line of the display panel 160 is asserted to turn on pixels on the scan line (or namely to drive the scan line) and before the switching signal TP is asserted to activate the output multiplexer 130, the switching unit 121 is conducted to perform a charge sharing function on the display panel 160. Since each of the output buffers 111-112 serves as a voltage follower in which the output signal thereof changes as the input signal thereof, the charge sharing function makes the pixels on the data lines D1 and D2 as for the same scan line shares residual charges on the display panel 160, and then reduces a voltage swing range of each output buffer for saving power consumption when the output multiplexer 130 is asserted. The charge sharing function is optional and is performed on the display panel 160 according to requirement.

The detection module 140 is coupled to the output terminal O1 of the output buffer 111 via the switching unit 122. When the switching signal TP is asserted to activate the output multiplexer 130, the switching unit 122 is conducted, such that the detection module 140 detects a rise time of the first enhanced pixel signal (e.g. a time interval between a first preset voltage V1 and a second preset voltage V2 that a voltage of the first enhanced pixel signal at the output terminal O1 varies from and to), or namely detects a slew rate of the first output buffer 111 under a voltage difference. In the meanwhile, the slew rate of the first enhanced pixel signal at the output terminal O1 reflects to a loading of the display panel 160.

The detection module 140 includes comparators CMP1-CMP2, a time-to-digital converter 141, and a bias circuit 142, wherein the bias circuit 142 provides the first preset voltage V1 and the second preset voltage V2. The comparator CMP1 compares the voltage of the first enhanced pixel signal at the output terminal O1 with the first preset voltage V1, and thereby outputs a first indication signal In1. The comparator CMP2 compares the voltage of the first enhanced pixel signal at the output terminal O1 with the second preset voltage V2, and thereby outputs a second indication signal In2. The time-to-digital converter 141 converts the time interval (rise time) into a digital signal DI for the convenience of being read by post-processing elements.

For example, the time-to-digital converter 141 may includes a counter that starts counting when the first indication signal In1 is asserted, and then stops counting when the second indication signal In2 is asserted. Then, the time-to-digital converter 141 generates the digital signal DI according to a counting result. Moreover, the time-to-digital converter 141 may includes a pulse generator that generates a rising edge of a pulse signal when the first indication signal In1 is asserted and then generates a falling edge of the pulse signal when the second indication signal In2 is asserted, wherein a pulse width of the pulse signal is substantially equal to the time interval. Then, the rising edge and the falling edge of the pulse signal can respectively trigger a counter to start counting and stop counting. People ordinary skilled in the art can refer any kinds of time-to-digital converter to convert the time interval into the digital signal, and the present invention is not limited thereto.

Figure 2A:
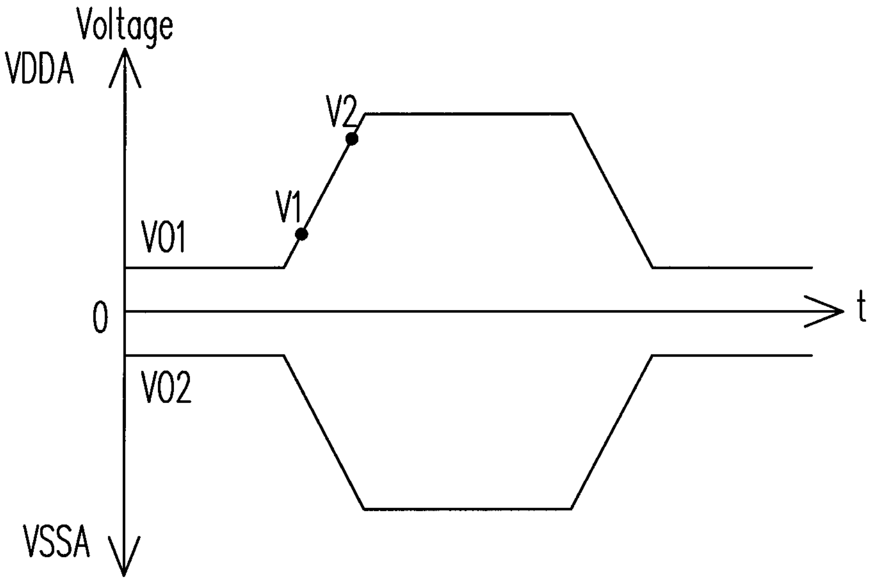
FIG. 2A is a diagram of the first enhanced pixel signal and the second enhanced pixel signal according to the embodiment in FIG. 1.
Figure 2B:
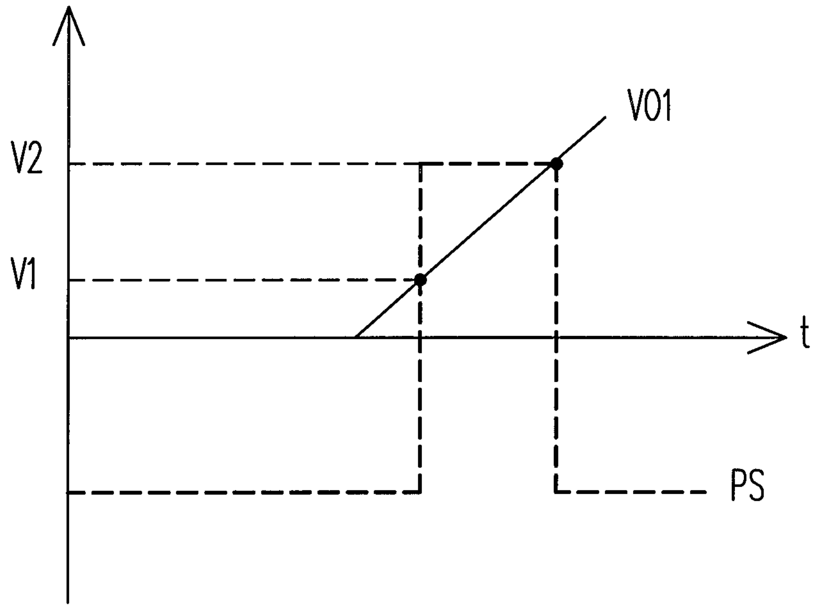
FIG. 2B is a diagram of detecting the rise time that the first enhanced pixel signal according to the embodiment in FIG. 2A.

FIG. 2A is a diagram of the first enhanced pixel signal and the second enhanced pixel signal according to the embodiment in FIG. 1. FIG. 2B is a diagram of detecting the time interval that the first enhanced pixel signal according to the embodiment in FIG. 2A. Referring to FIG. 2A, generally, the first enhanced pixel signal VO1 with positive polarity and the second enhanced pixel signal VO2 with negative polarity respectively have different voltage levels, i.e. high voltage between 0 volt and a positive power voltage VDDA, and low voltage between 0 volt and a negative power voltage VSSA. Referring to FIG. 2B, the time-to-digital converter 141 generates the rising edge of the pulse signal PS when the comparator CMP1 detects that the first enhanced pixel signal VO1 reaches the first preset voltage V1, and the time-to-digital converter 141 generates the falling edge of the pulse signal PS when the comparator CMP2 detects that the first enhanced pixel signal VO1 reaches the second preset voltage V2. The pulse width of the pulse signal PS is substantially equal to the time interval.

The conversion module 150 is coupled between the output buffers 111-112 and the detection module 140. The conversion module 140 adjusts a tail current of the output buffers 111-112 in response to the digital signal DI representing time interval. The increases of the tail current assists in increasing a bias current flowing within each of the output buffer 111-112. Therefore, the driving capability of each output buffer can be adjusted according to the loading of the display panel 160, so dose the slew rate of the signal outputted from each output buffer. The following describes the operation of the conversion module in detail.

Figure 3:
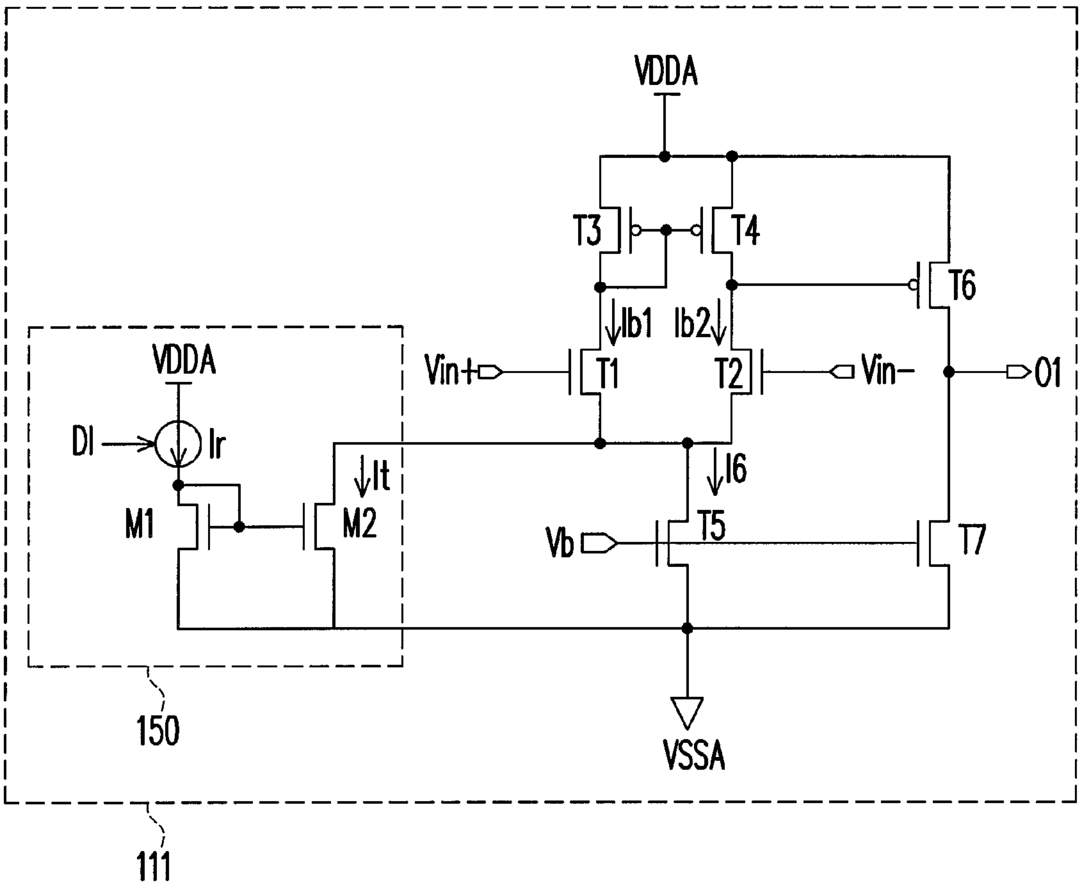
FIG. 3 is a diagram of the output buffer and the conversion module according to the embodiment in FIG. 1.

FIG. 3 is a diagram of the output buffer and the conversion module according to the embodiment in FIG. 1. Referring to FIG. 3, the common output buffer 111 includes a differential input pair composed of transistors T1-T2, a current mirror circuit composed of transistors T3-T4, a current source implemented by a transistor T5, and a output stage module composed of transistor T6-T7. The current source provides a bias current Ib to the different input pair for driving the output buffer 111 to operate. Since the output buffer 111 has the inverted terminal Vin− thereof coupled to the output terminal O1 thereof, the differential input pair induces a first current Ib1 and a second current Ib2 according to the first pixel signal Vin1 received at the non-inverted terminal Vin+ and the first enhanced pixel signal at the output terminal O1. The current mirror circuit in the output buffer 111 provides the first current Ib1 and the second current Ib2 to the differential input pair. The output stage module generates the first enhanced pixel signal via the output terminal O1 according to the second current Ib2.

The conversion module 150 includes a current mirror circuit composed of transistors M1-M2. The current mirror circuit in the conversion module 150 generates a reference current Ir according to the digital signal DI, and then generates the tail current It by mirroring the reference current Ir to the output buffer 111. For example, the conversion module 150 may includes a plurality of current sources having different amounts of current, and by digital control, one of the current sources in the conversion module 150 is selected according to the digital signal DI to serve as the reference current Ir. The larger the digital signal representing the time interval is, the larger the current of the selected current source is. Therefore, the conversion module 150 can adjust the tail current It provided to the output buffer 111 according to the loading of the display panel.

According to the operation of the output buffer 111, a sum of the first current Ib1 and the second current Ib2 induced by the differential input pair is substantially equal to a sum of the bias current Ib and the tail current It. The tail current It provided by the conversion module 150 can assist in increasing the driving capability of the output buffer 111 and the slew rate of the first enhanced pixel signal outputted from the output buffer 111. As a result, by the operation of the feedback mechanism composed of the detection module 140 and the conversion module 150, the source driver 100 can drive the display panels with different loads.

It should be noted that although the said embodiment in FIG. 3 shows one detail circuit of the output buffer 111 to describe the adjustment of the tail current It, the present invention is not limited to the kinds or designs of the output buffer. Since the tail current It affects the bias current of the output buffer. People ordinarily skilled in the art can adjust the slew rate of the signal outputted from any kinds output buffer, such as a rail-to-rail output buffer, the output buffer including P-type or N-type differential input pair, and etc., according to the teaching of the said embodiment.

Figure 4:
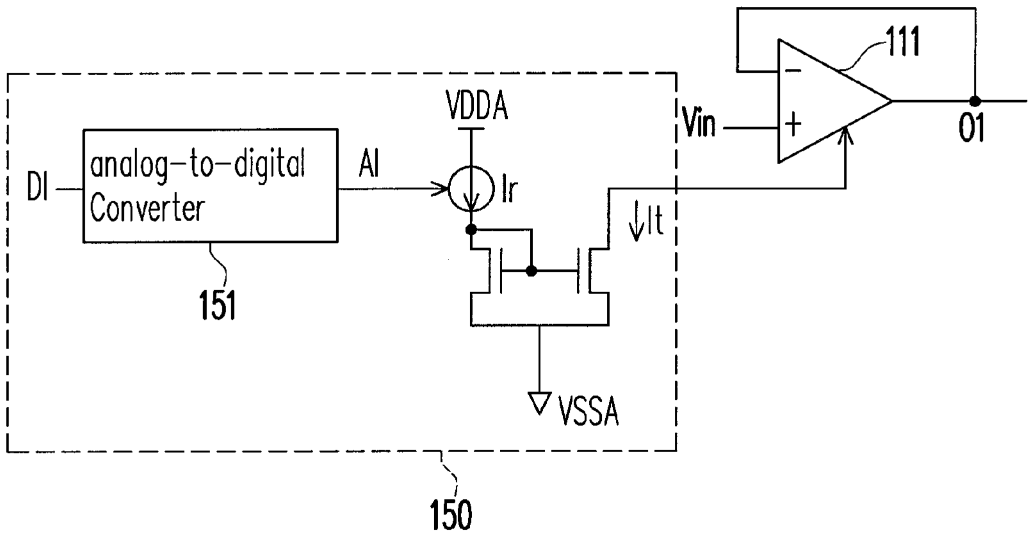
FIG. 4 is a diagram of the output buffer and the conversion module according to the embodiment in FIG. 1.

FIG. 4 is a diagram of the output buffer and the conversion module according to the embodiment in FIG. 1. Referring to FIG. 3 and FIG. 4, the difference between the embodiments in FIG. 3 and FIG. 4 is that the conversion module 150 in FIG. 4 further includes a digital-to-analog converter 151. The digital-to-analog converter 151 converts the digital signal DI into an analog input signal AI. The analog input signal AI can be used to control a conductive state of a transistor, and then a current flowing through the transistor can serve as the reference currents. By analog control, the current mirror circuit in the conversion module 150 generates the reference current Ir according to the analog input signal AI.

In summary, the said embodiment provides the source driver 100 that utilizes the detection module to obtain the time interval that the first enhanced pixel signal reaches the second preset voltage from the first preset voltage. The time interval reflects the loading of the display panel. For adaptively driving the display panels with different loads, the conversion module adjusts the tail current provided to the output buffer in response to the time interval. The increases of the tail current assists in increasing the bias current flowing within each of the output buffers. Therefore, through the feedback mechanism composed of the detection module and the conversion module, the source driver can dynamically and automatically adjust the slew rate of the signal outputted from the output buffer for being adapted to drive the display panels with different loads.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A source driver, adapted to drive a display panel, comprising:

a first output buffer, receiving a first pixel signal via an input terminal thereof for enhancing the first pixel signal and thereby outputting a first enhanced pixel signal to the display panel via an output terminal thereof;

a detection module, coupled to the output terminal the first output buffer for detecting a rise time of the first enhanced pixel signal, wherein the rise time is a time interval between a first preset voltage and a second preset voltage that the first enhanced pixel signal reached; and a conversion module, coupled between the first output buffer and the detection module for adjusting a driving capability of the first output buffer in response to the rise time so as to adjust a slew rate of the first output buffer, wherein the detection module comprises:

a first comparator, comparing a voltage of the first enhanced pixel signal with the first preset voltage and thereby outputting a first indication signal;

a second comparator, comparing the voltage of the first enhanced pixel signal with the second preset voltage and thereby outputting a second indication signal; and a bias circuit, providing the first preset voltage and the second preset voltage to the first comparator and the second comparator.

2. The source driver as claimed in claim 1, wherein the driving capability of the first output buffer is adjusted by adjusting a tail current of the first output buffer.

3. The source driver as claimed in claim 2, wherein the detection module further comprises:

a time-to-digital converter, generating a digital signal representing the rise time according to the first indication signal and the second indication signal.

4. The source driver as claimed in claim 3, wherein the time-to-digital converter is activated by the first indication signal to start counting and is inactivated by the second indication signal to stop counting, so as to generating the digital signal according to a counting result.

5. The source driver as claimed in claim 3, wherein the conversion module comprises:

a first current mirror circuit, generating a reference current according to the digital signal, and generating the tail current by mirroring the reference current to the first output buffer.

6. The source driver as claimed in claim 5, wherein the conversion module further comprises:

a digital-to-analog converter, converting the digital signal into an analog input signal, wherein the first current mirror circuit generates the reference current according to the analog input signal.

7. The source driver as claimed in claim 2, wherein the first output buffer comprises:

a differential input pair, having a first input terminal receiving the first pixel signal and a second input terminal receiving the enhanced pixel signal, wherein the differential input pair induces a first current and a second current according to the first pixel signal and the first enhanced pixel signal;

a second current mirror circuit, coupled to the differential input pair for providing the first current and the second current to the differential input pair;

a current source, coupled to the differential input pair for providing a bias current to the differential input pair, wherein a sum of the first current and the second current is substantially equal to a sum of the bias current and the tail current; and an output stage module, generating the first enhanced pixel signal according to the second current.

8. The source driver as claimed in claim 1, further comprising:

a second output buffer, receiving a second pixel signal via an input terminal thereof for enhancing the second pixel signal and thereby outputting a second enhanced pixel signal to the display panel via an output terminal thereof; and an output multiplexer, coupled between the display panel and the output terminals of the first output buffer and the second output buffer for respectively transmitting the first enhanced pixel signal and the second enhanced pixel signal to a first data line and a second data line of the display panel according to a switching signal.

9. The source driver as claimed in claim 8, further comprising:

a first switching unit, coupled between the output terminal of the first output buffer and the output terminal of the second output buffer for performing a charge sharing function on the display panel, wherein the first switching unit is conducted after a scan signal is asserted to drive a scan line of the display panel and before the switching signal is asserted to activate the output multiplexer.

10. The source driver as claimed in claim 8, further comprising:

a second switching unit, coupled between the output terminal of the first output buffer and the detection module, wherein the second switching unit is conducted when the switching signal is asserted to activate the output multiplexer.

11. The source driver as claimed in claim 8, wherein the first pixel signal and the second pixel signal respectively have positive polarity and negative polarity.

* * * * *